United States Patent
Glen et al.

(10) Patent No.: US 11,339,567 B2
(45) Date of Patent: *May 24, 2022

(54) FIRE-RETARDANT PANEL WITH FRAME

(71) Applicant: SEMCO LLC, Columbia, MO (US)

(72) Inventors: Stephen Glen, Columbia, MO (US);
Yu-Wei Hung, Columbia, MO (US);
Hashim Alsadah, Columbia, MO (US);
John C. Fischer, Marietta, GA (US)

(73) Assignee: SEMCO LLC, Columbia, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,673

(22) Filed: Oct. 13, 2020

(65) Prior Publication Data

US 2021/0040729 A1 Feb. 11, 2021

Related U.S. Application Data

(63) Continuation of application No. 16/124,024, filed on Sep. 6, 2018, now Pat. No. 10,837,170.

(Continued)

(51) Int. Cl.
*B32B 3/06* (2006.01)
*E04B 1/94* (2006.01)
(Continued)

(52) U.S. Cl.
CPC ............... *E04B 1/942* (2013.01); *B32B 3/06* (2013.01); *B32B 3/08* (2013.01); *B32B 13/06* (2013.01);
(Continued)

(58) Field of Classification Search
CPC ... B32B 3/06; B32B 3/08; E04B 1/192; E04C 2/28; E04C 2/34; E04C 2/292
See application file for complete search history.

(56) References Cited

U.S. PATENT DOCUMENTS

| | | |
|---|---|---|
| 2,090,480 A | 8/1937 | Hawley |
| 4,015,393 A | 4/1977 | Warwick |

(Continued)

FOREIGN PATENT DOCUMENTS

JP 08312027 A 11/1996

OTHER PUBLICATIONS

Acta Polytechnica vol. 49 No. Jan. 2009, Thermal Conductivity of Gypsum at High Temperatures, A Combined Experimental and Numerical Approach, I. Rahmanian, Y. Wang.

(Continued)

*Primary Examiner* — Elizabeth E Mulvaney
(74) *Attorney, Agent, or Firm* — Allan Watts

(57) ABSTRACT

Fire-retardant panels that include: a frame with multiple holes that reduce heat conduction through the panel; or a frame that includes two portions separated by a layer of fire-resistant material (e.g., gypsum, calcium silicate, or gypsum board). Some embodiments include skins (e.g., sheet metal) or insulation (e.g., between skin and fire-resistant material, for instance, within the frame). In particular embodiments, the fire-resistant material is (e.g., midway) between: two skins, two layers of insulation, two portions of the frame, or a combination thereof. The portions of the frame can be: sheet metal, attached (e.g., screwed) to the skin(s) or to each other, or extend around the perimeter. The frame can include: various elongated members, (e.g., parallel) bends, or holes that are: in at least one row, elongated, or slots (e.g., parallel to each other or to the skin).

25 Claims, 8 Drawing Sheets

Related U.S. Application Data

(60) Provisional application No. 62/558,236, filed on Sep. 13, 2017.

(51) Int. Cl.
    *E04C 2/28*     (2006.01)
    *E04C 2/292*     (2006.01)
    *E04C 2/34*     (2006.01)
    *B32B 13/06*     (2006.01)
    *B32B 19/04*     (2006.01)
    *E04C 2/52*     (2006.01)
    *E04B 1/61*     (2006.01)
    *B32B 3/08*     (2006.01)
    *E04C 2/00*     (2006.01)

(52) U.S. Cl.
    CPC .......... *B32B 19/041* (2013.01); *E04B 1/6133* (2013.01); *E04C 2/28* (2013.01); *E04C 2/292* (2013.01); *E04C 2/34* (2013.01); *E04C 2/526* (2013.01); *B32B 2307/306* (2013.01); *B32B 2307/3065* (2013.01); *B32B 2607/00* (2013.01); *E04B 2103/02* (2013.01); *E04B 2103/06* (2013.01); *E04C 2002/004* (2013.01); *E04C 2002/3488* (2013.01)

(56) References Cited

U.S. PATENT DOCUMENTS

| | | | |
|---|---|---|---|
| 4,901,485 | A | 2/1990 | Menchetti |
| 4,949,518 | A | 8/1990 | Nagel |
| 5,613,338 | A | 3/1997 | Esposito |
| 6,061,985 | A | 5/2000 | Kraus |
| 6,389,769 | B1 | 5/2002 | McKinney |
| 7,849,648 | B2 | 12/2010 | Tonyan |
| 2011/0091713 | A1 | 4/2011 | Miller |
| 2015/0367603 | A1 | 12/2015 | Guandalini |
| 2017/0175436 | A1 | 6/2017 | Nelson |
| 2017/0267587 | A1 | 9/2017 | Abolt |
| 2018/0298609 | A1 | 4/2018 | Banerjee |

OTHER PUBLICATIONS

FR-Panl Solutions, Fire Rated Panel, Datasheet, FlaktGroup, SEMCO, Nov. 7, 2018.

Panl Solutions, Systems by SEMCO, Structural Integrity, Easterner Installation, FlaktGroup, SEMCO, Nov. 7, 2018.

FR-Panl Solutions, Fire Rated Panel, Code-Compliant, Structural, FlaktGroup, SEMCO, Nov. 7, 2018.

US 11,339,567 B2

FIRE-RETARDANT PANEL WITH FRAME

RELATED PATENT APPLICATIONS

This patent application is a continuation patent application of, and claims priority to, U.S. patent application Ser. No. 16/124,024, filed on Sep. 6, 2018, which is a nonprovisional patent application of, and claims priority to, U.S. Provisional Patent Application Ser. No. 62/558,236, FIRE-RETARDANT PANEL AND METHOD, filed on Sep. 13, 2017. The current patent application, and both priority patent applications, have the same inventors and assignee. The contents of both priority patent applications are incorporated herein by reference.

FIELD THE INVENTION

This invention relates to fire-retardant panels and systems and methods for reducing fire danger, for example, in buildings. Particular embodiments relate to fire-rated panels and systems and fire walls and enclosures.

BACKGROUND OF THE INVENTION

Sandwich panels are composite structural elements that include two (e.g., thin, for example, sheet metal) faces separated by a relatively thick internal layer or layers (e.g., of a material that is different than the faces, typically, less dense, less strong, or both). Sandwich panels can be easy and fast to install, which can provide time-savings, labor-savings cost-saving, or a combination thereof. Further, fire losses are a significant issue in terms of both frequency and total losses including loss of life. Thus, the fire safety in buildings has garnered significant attention over the years. The public, code bodies, local, regional and federal governments, and the design, build, and ownership communities, are all affected by fire safety. Fire retardant sandwich panels are available in the market from different suppliers. A common fire-retardant panel design consists of a high-density fire-retardant mineral-wool core clad in sheet metal. Fire-retardant panels have been used to construct fire walls and enclosures to reduce fire danger, but traditionally, to reduce heat transfer from the flame-exposed side to the other side of a panel, there has been no internal supportive structure (e.g., frame or channels). Hence, the structural strength of a traditional fire-retardant panel was not very high.

Various other walls, however, have included framing, and gypsum board, including type X drywall, has been used to make a fire barrier, for example, by nailing or screwing it to a wall at a jobsite or in a building and taping and sealing joints between sheets of gypsum board with drywall joint compound. Accel Syntheon document CCRR-0121 describes an example that uses gypsum board. Gypsum board, however, has been labor intensive to install at a jobsite and has required specialized skills to install. In addition, fire-retardant panels have had a limited ability to slow the progression of a fire. Needs and opportunities for improvement exist, for example, for fire-retardant panels, systems, and methods: that are easy to install, that do not require special (e.g., drywall) skill to install, that are strong, that are durable, that are inexpensive to make and to install, that are made of readily available materials, that are more effective at slowing the progression of a fire, that are aesthetically appealing, or a combination thereof. Room for improvement exists over the prior art in these and various other areas that may be apparent to a person of ordinary skill in the art having studied this document.

SUMMARY OF PARTICULAR EMBODIMENTS OF THE INVENTION

This invention provides, among other things, various fire-retardant panels and systems and methods for reducing fire danger, for example, in buildings. Particular panels are fire-rated, can be used to construct fire walls or enclosures, or a combination thereof, for instance, to reduce fire danger. Various embodiments include readily available materials that are assembled in a new way to make a fire barrier that is: stronger, more effective at slowing the progression of a fire, easy to install (e.g., not requiring special skill), durable, inexpensive to make, inexpensive to install, aesthetically appealing, or a combination thereof. Different embodiments of fire-retardant panels are made of various combinations or layers of metal skins, frames, insulation (e.g., mineral wool), fire-resistant material (e.g., gypsum board), or a combination thereof, as examples. In some embodiments, frames include holes or slots, for example, in rows, for instance, that reduce heat transfer through the frame.

Various embodiments provide, for example, as an object or benefit, that they partially or fully address or satisfy one or more of the needs, potential areas for benefit, or opportunities for improvement described herein, or known in the art, as examples. Different embodiments simplify the design and installation of fire-retardant systems, reduce the installed cost of the technology, increase energy efficiency, or a combination thereof, as further examples. In addition, various other embodiments of the invention are also described herein, and other benefits of certain embodiments may be apparent to a person of ordinary skill in the art.

Specific embodiments include various fire-retardant panels. Some embodiments, for example, are or include a fire-retardant panel that has a frame that has multiple holes (e.g., in at least one row). In various embodiments, the multiple holes reduce heat conduction through the fire-retardant panel. Some such embodiments include a layer of fire-resistant material, for example, that includes gypsum, calcium silicate, or both. Further, some embodiments include a first skin, a first layer of insulation, or both. Moreover, in certain embodiments, the first layer of insulation is between the first skin and the layer of fire-resistant material. Further still, some embodiments include a second skin. In some embodiments, for example, the first skin includes a first layer of sheet metal, the second skin includes a second layer of sheet metal, or both. Even further still, in particular embodiments, the layer of fire-resistant material is (e.g., midway) between the first skin and the second skin.

Still further, in some embodiments the frame includes a first portion and a second portion, and the first portion is separated from the second portion by the layer of fire-resistant material. Even further, in certain embodiments the first portion of the frame is attached to the first skin, the second portion of the frame is attached to the second skin, or both. Even further still, in particular embodiments, the panel includes a perimeter and the frame extends around the perimeter of the panel. Moreover, in various embodiments, the frame includes sheet metal, for example, that includes two bends, for example, that are parallel (i.e., to each other). Furthermore, in particular embodiments, the frame includes a first elongated member, a second elongated member (e.g., adjacent to the first elongated member), a third elongated member (e.g., adjacent to the second elongated member, opposite the first elongated member, or both) and a fourth elongated member (e.g., adjacent to the third elongated member, adjacent to the first elongated member, opposite the second elongated member, or a combination thereof). In addition, in certain embodiments, the frame further includes a fifth elongated member (e.g., extending from the first elongated member to the third elongated member, between the second elongated member and the fourth elongated member, or both). Even further, in particular embodiments, the first skin is attached to the frame, the second skin is attached to the frame (e.g., with screws), or both. Moreover, in various embodiments, the multiple holes are elongated, the multiple holes are slots (e.g., that are parallel to each other), or a combination thereof. Further, in certain embodiments, the at least two rows are parallel to the first skin, for instance.

Other specific embodiments include various fire-retardant panels that include a layer of fire-resistant material and a frame that includes a first portion and a second portion. Various embodiments include a first skin and a second skin and the layer of fire-resistant material is between the first skin and the second skin. Further, in a number of embodiments, the first portion and the second portion are separated by the layer of fire-resistant material. Still further, some embodiments include a first layer of insulation between the first skin and the layer of fire-resistant material, a second layer of insulation between the second skin and the layer of fire-resistant material, or both. Even further, in a number of embodiments, the first portion of the frame extends from the first skin to the layer of fire-resistant material, the second portion of the frame extends from the second skin to the layer of fire-resistant material, or both. Further still, in certain embodiments, the frame extends around the perimeter of the panel and the first layer of insulation is located within the first portion of the frame, the second layer of insulation is located within the second portion of the frame, or both. Even further still, in particular embodiments, the first portion of the frame is attached to the second portion of the frame, for example, with screws, for instance, that extend though the layer of fire-resistant material. Moreover, in various embodiments, the layer of fire-resistant material includes gypsum or calcium silicate; the first skin is or includes sheet metal; and the second skin is or includes sheet metal, or a combination thereof, as examples.

BRIEF DESCRIPTION OF THE DRAWINGS

The drawings provided herewith illustrate, among other things, examples of certain aspects of particular embodiments. Various embodiments may include aspects: shown in the drawings, described in the specification (including the claims), described in the other materials that are incorporated by reference, that are known in the art, or a combination thereof, as examples. Other embodiments, however, may differ. Further, where the drawings show one or more components, it should be understood that, in other embodiments, there could be just one or multiple (e.g., any appropriate number) of such components.

DETAILED DESCRIPTION OF EXAMPLES OF EMBODIMENTS

Figure 1:
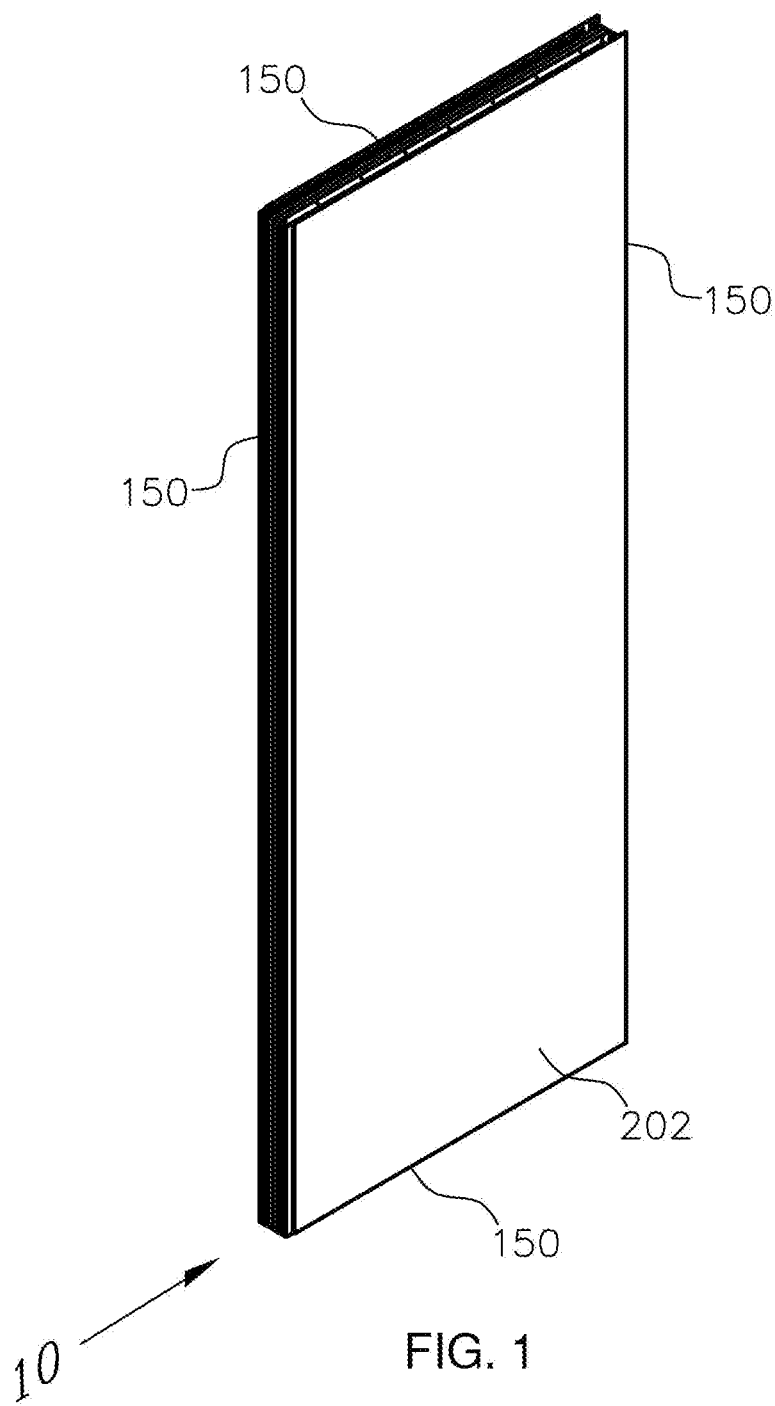
FIG. 1 is an isometric view of an example of a fire-retardant panel shown oriented vertically.

This patent application describes, among other things, examples of certain embodiments, and certain aspects thereof. Other embodiments may differ from the examples described in detail herein. Various embodiments include systems and methods for reducing fire danger or slowing the spread of a fire. The claims describe certain examples of embodiments, but other embodiments may differ. Various embodiments may include aspects shown in the drawings, described in the text, shown or described in other documents that are identified, known in the art, or a combination thereof, as examples. Moreover, certain procedures may include acts such as obtaining or providing various (e.g., structural) components described herein and obtaining or providing components that perform functions described herein. Furthermore, various embodiments include advertising and selling products that perform functions described herein, that contain structure described herein, or that include instructions to perform functions described herein, as examples. The subject matter described herein also includes various means for accomplishing the various functions or acts described herein or that are apparent from the structure and acts described. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

Various methods may further include acts of obtaining, providing, assembling, or making various components described herein or known in the art. Other embodiments include a building that includes one or more fire-retardant panels or a system, wall, or enclosure, for instance, as described herein. Various methods in accordance with different embodiments include acts of selecting, making, positioning, assembling, or using certain components, as examples. Other embodiments may include performing other of these acts on the same or different components, or may include fabricating, assembling, obtaining, providing, ordering, receiving, shipping, or selling such components, or other components described herein or known in the art, as other examples. Further, various embodiments include various combinations of the components, features, and acts described herein or shown in the drawings, for example. Other embodiments may be apparent to a person of ordinary skill in the art having studied this document.

In many embodiments, for example, a fire-retardant panel (e.g., 10 shown in FIGS. 1-4) includes a first skin (e.g., 201 shown in FIG. 2), a second skin (e.g., 202 shown in FIGS. 1-4), and a layer of fire-resistant material (e.g., 210 shown in FIGS. 2-4), for instance, between (e.g., midway between) the first skin (e.g., 201) and the second skin (e.g., 202). Further, in many such embodiments the first skin (e.g., 201) includes a first layer of sheet metal, the second skin (e.g., 202) includes a second layer of sheet metal, the layer of fire-resistant material (e.g., 210) includes gypsum or calcium silicate, or a combination (e.g., all) thereof. Further still, in some such embodiments, the fire-retardant panel (e.g., 10) further includes a first layer of insulation (e.g., 421 shown in FIG. 4), a second layer of insulation (e.g., 322 shown in FIG. 3), or both. Insulation (e.g., layers 421 and 322) is omitted from FIG. 2 for clarity but is shown in FIGS. 5-8. Even further, in particular embodiments the first layer of insulation (e.g., 421) is between the first skin (e.g., 201) and the layer of fire-resistant material (e.g., 210), the second layer of insulation (e.g., 322) is between the second skin (e.g., 202) and the layer of fire-resistant material (e.g., 210), or both. In a number of embodiments, the insulation (e.g., in layer 421, 322, or both) is contiguous with or touches the skin (e.g., 201 or 202), for example. In many embodiments, however, there is no adhesive or bond between the insulation (e.g., in layer 421, 322, or both) and the skin (e.g., 201 or 202). In other embodiments, however, the insulation (e.g., in layer 421, 322, or both) is bonded to the skin (e.g., 201 or 202), for example, with an adhesive. Similarly, in a number of embodiments, the insulation (e.g., in layer 421, 322, or both) is contiguous with or touches the fire-resistant material (e.g., 210). In many embodiments, however, there is no adhesive or bond between the insulation (e.g., in layer 421, 322, or both) and the fire-resistant material (e.g., 210). In other embodiments, however, the insulation (e.g., in layer 421, 322, or both) is bonded to the fire-resistant material (e.g., 210), for example, with an adhesive.

In various embodiments, a fire-retardant panel (e.g., 10) includes a first layer of insulation (e.g., 421), a second layer of insulation (e.g., 322), and a layer of fire-resistant material (e.g., 210), for example, between the first layer of insulation (e.g., 421) and the second layer of insulation (e.g., 322). See, for example, FIGS. 5-8. Further still, some such embodiments further include the first skin (e.g., 201), the second skin (e.g., 202), or both. Still further, in certain of these embodiments, the first skin (e.g., 201) includes (e.g., is) the first layer of sheet metal, the second skin (e.g., 202) includes (e.g., is) the second layer of sheet metal, or both. Even further, in some embodiments, the first layer of insulation (e.g., 421) is between the first skin (e.g., 201) and the layer of fire-resistant material (e.g., 210), the second layer of insulation (e.g., 322) is between the second skin (e.g., 202) and the layer of fire-resistant material (e.g., 210), or both.

Still further, in a number of embodiments, a fire-retardant panel (e.g., 10) includes a first skin (e.g., 201), a layer of fire-resistant material (e.g., 210), and a first layer of insulation (e.g., 421), for instance, between the first skin (e.g., 201) and the layer of fire-resistant material (e.g., 210). See, for example, FIGS. 4-8. In many such embodiments, for example, the first skin (e.g., 201) includes a first layer of sheet metal, the layer of fire-resistant material (e.g., 210) includes gypsum (or calcium silicate, in some embodiments), or both. In various embodiments (e.g., previously described, or described herein, but not just in this paragraph), the panel (e.g., 10) includes a frame (e.g., 230 shown in FIGS. 2-4). In some embodiments, the frame (e.g., 230, or portion 231 thereof, for instance, sheet metal) extends from the first skin (e.g., 201) to the layer of fire-resistant material (e.g., 210). See, for example, FIGS. 4-8. Further, in certain embodiments, the first layer of insulation (e.g., 421) is located within the (e.g., sheet-metal) frame (e.g., 230, or portion 231 thereof, for instance, as shown in FIGS. 4-8). Similarly, in some embodiments, the frame (e.g., 230, or portion 232 thereof, for instance, sheet metal) extends from the second skin (e.g., 202) to the layer of fire-resistant material (e.g., 210). Further still, in certain embodiments, the second layer of insulation (e.g., 322) is located within the (e.g., sheet-metal) frame (e.g., 230, or portion 232 thereof, for instance, as shown in FIGS. 3 and 5-8).

In the embodiment shown, the first layer of insulation (e.g., 421) consists of three (e.g., equal-size) pieces or strips of insulation that are located in a (e.g., first) common plane or layer within the first portion (e.g., 231) of the (e.g., sheet-metal) frame (e.g., 230). Similarly, in the embodiment illustrated, the second layer of insulation (e.g., 322) consists of three (e.g., equal-size) pieces or strips of insulation that are located in a (e.g., second) common plane within the second portion (e.g., 232) of the (e.g., sheet-metal) frame (e.g., 230). Other embodiments may differ. For example, in different embodiments, an insulation layer may include or consist of 1, 2, 3, 4, 5, 6, 7, 8, 9, 10, 12, 15, or more pieces of insulation (e.g., that are located in a common plane, within a frame, or both).

Figure 3:
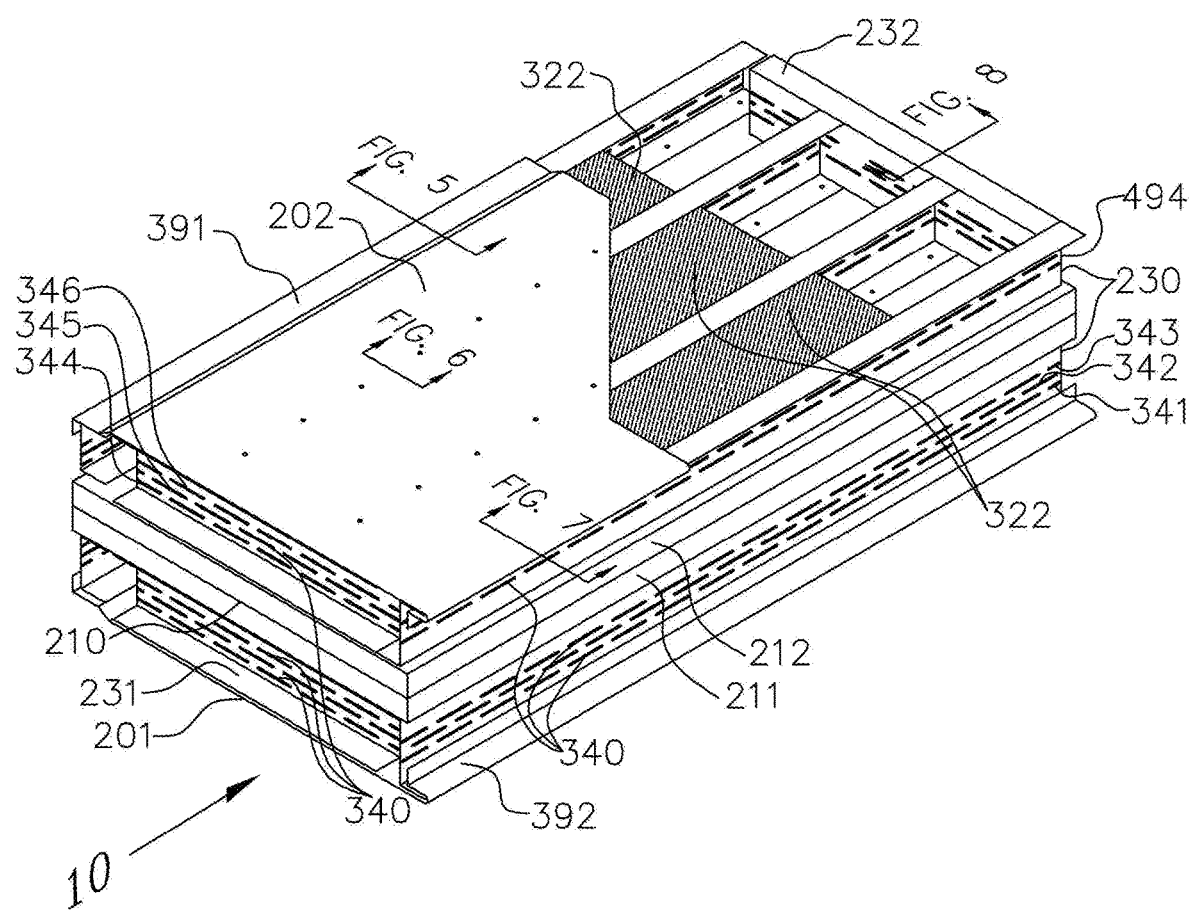
FIG. 3 is a more-detailed isometric view of the panel of FIGS. 1 and 2 showing the panel oriented horizontally with part of the second skin and part of a second layer of insulation removed to better show the frame, and showing, among other things, an example of multiple holes or slots in rows in the frame that are parallel to each other and are staggered in adjacent rows and reduce heat conduction through the fire-retardant panel.
Figure 4:
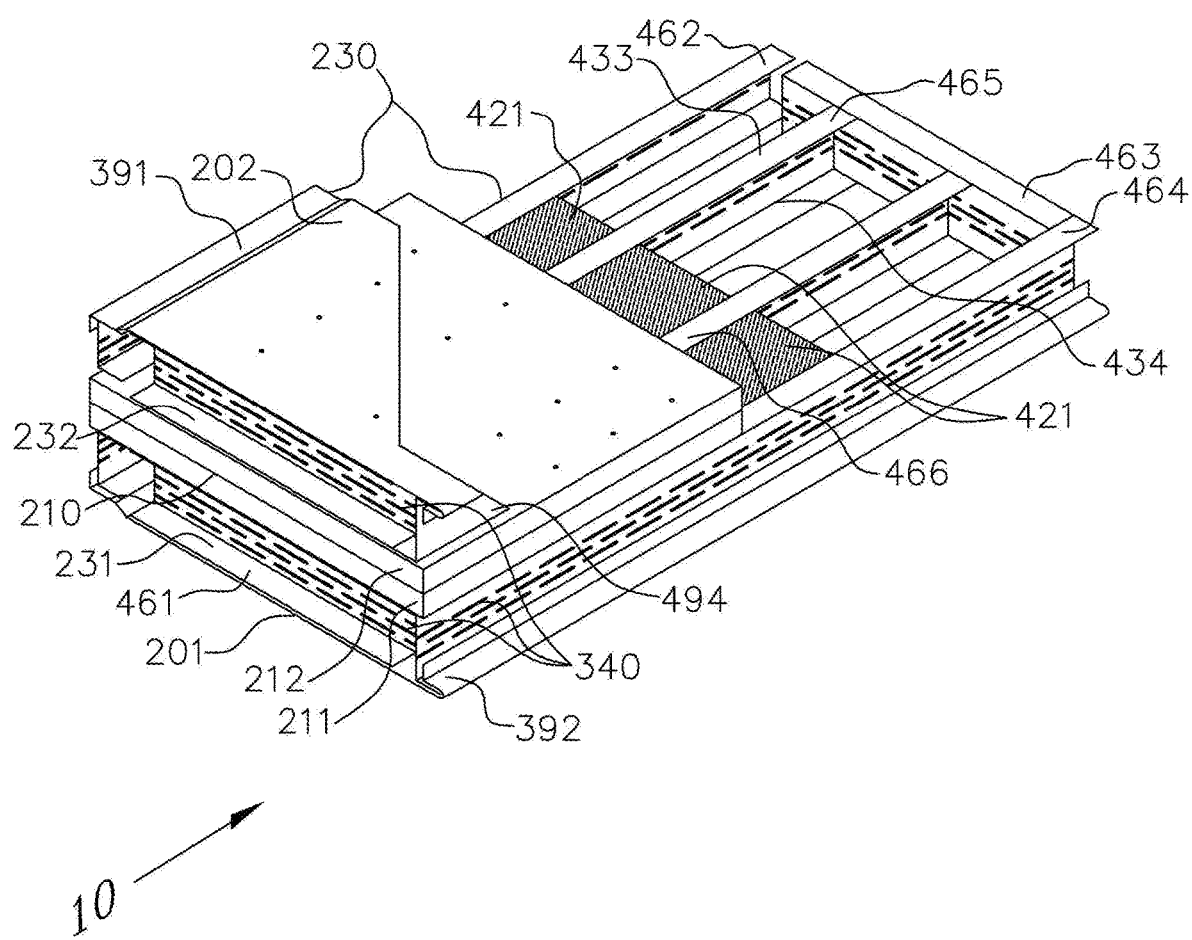
FIG. 4 is another isometric view of the panel of FIGS. 1 to 3 showing the panel oriented horizontally with more of the second skin and all of the second layer of insulation removed and part of the second portion of the frame, layer of fire-resistant material (e.g., two contiguous layers of gypsum board), and first layer of insulation removed to better show the first portion of the frame and first layer of insulation, and showing, among other things, more of the multiple holes or slots in rows in the frame that reduce heat conduction through the fire-retardant panel.
Figure 5:
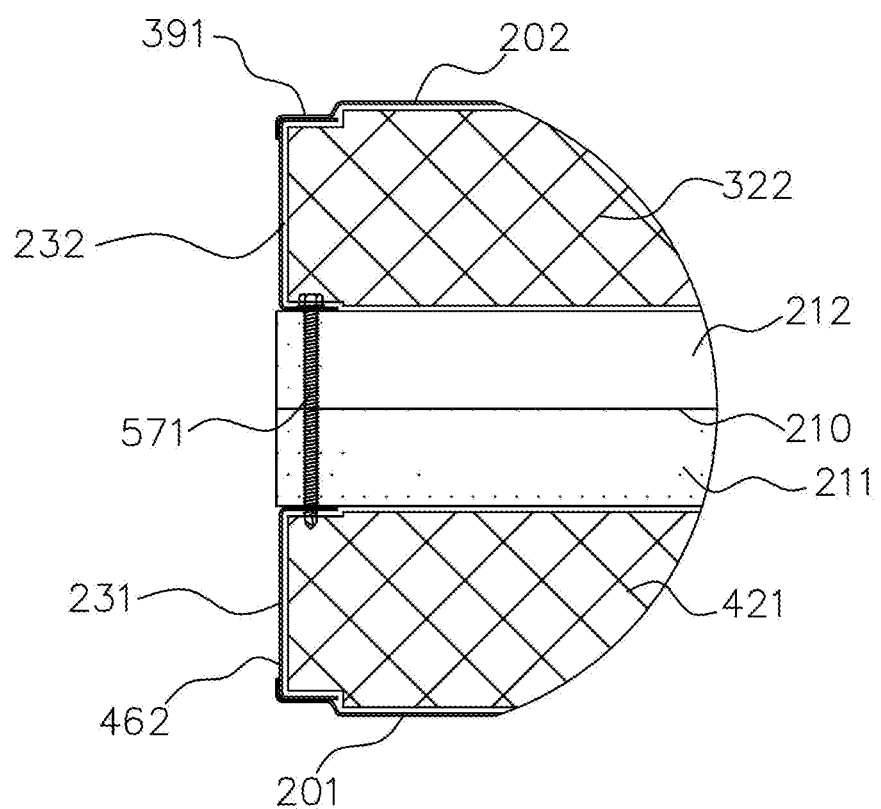
FIG. 5 is a detail cross-sectional view taken along the section line shown in FIG. 3, that shows, among other things, at least part of: a tongue at an edge of the panel for connecting two panels, the first skin, the second skin, the first layer of insulation, the second layer of insulation, the first portion of the frame, the second portion of the frame, the layer of fire-resistant material (e.g., two contiguous layers of gypsum board), cross sections of two elongated members or channels that are part of the frame, and a screw that connects the two portions of the frame to each other through the layer of fire-resistant material.
Figure 6:
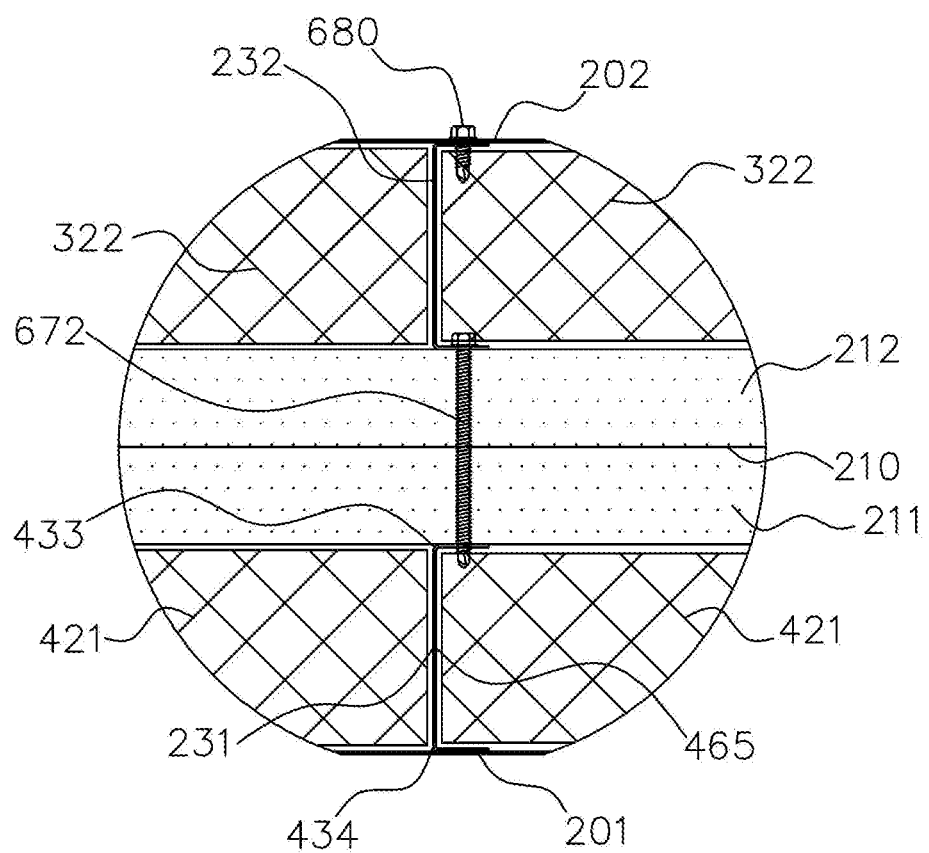
FIG. 6 is a detail cross-sectional view taken along the section line shown in FIG. 3, that shows, among other things, at least part of: the first skin, the second skin, the first layer of insulation, the second layer of insulation, the first portion of the frame, the second portion of the frame, the layer of fire-resistant material (e.g., two contiguous layers of gypsum board), cross sections of two elongated members or channels that are part of the frame, a screw that connects the two portions of the frame to each other through the layer of fire-resistant material, and another screw that connects the second skin to the second portion of the frame.
Figure 7:
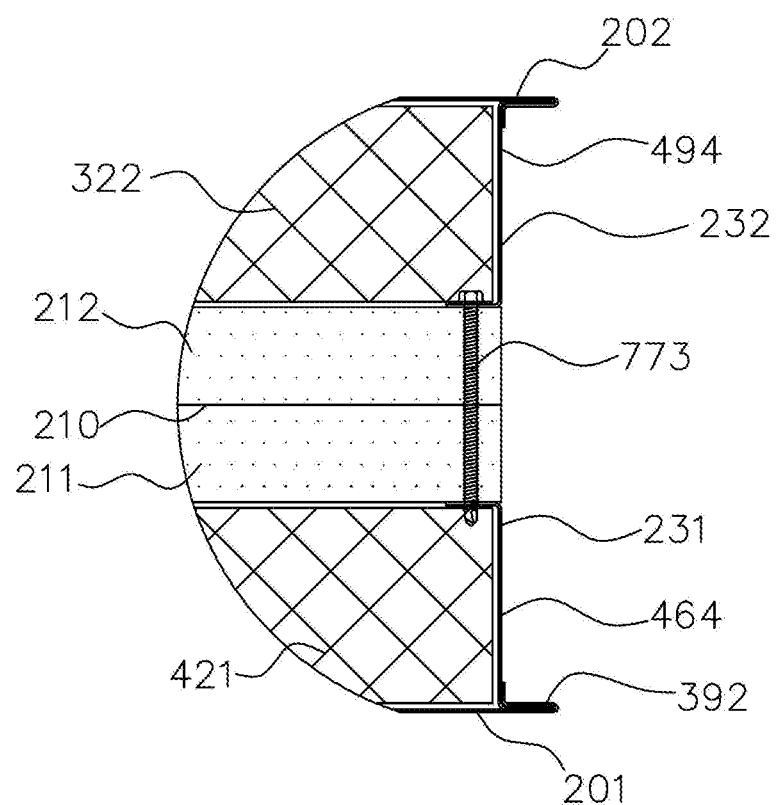
FIG. 7 is a detail cross-sectional view taken along the section line shown in FIG. 3, that shows, among other things, at least part of: a groove at an edge of the panel (i.e., opposite the edge and tongue of FIG. 5) for connecting two panels, the first skin, the second skin, the first layer of insulation, the second layer of insulation, the first portion of the frame, the second portion of the frame, the layer of fire-resistant material (e.g., two contiguous layers of gypsum board), cross sections of two elongated members that are not channels but are part of the frame, and another screw that connects the two portions of the frame to each other through the layer of fire-resistant material.
Figure 8:
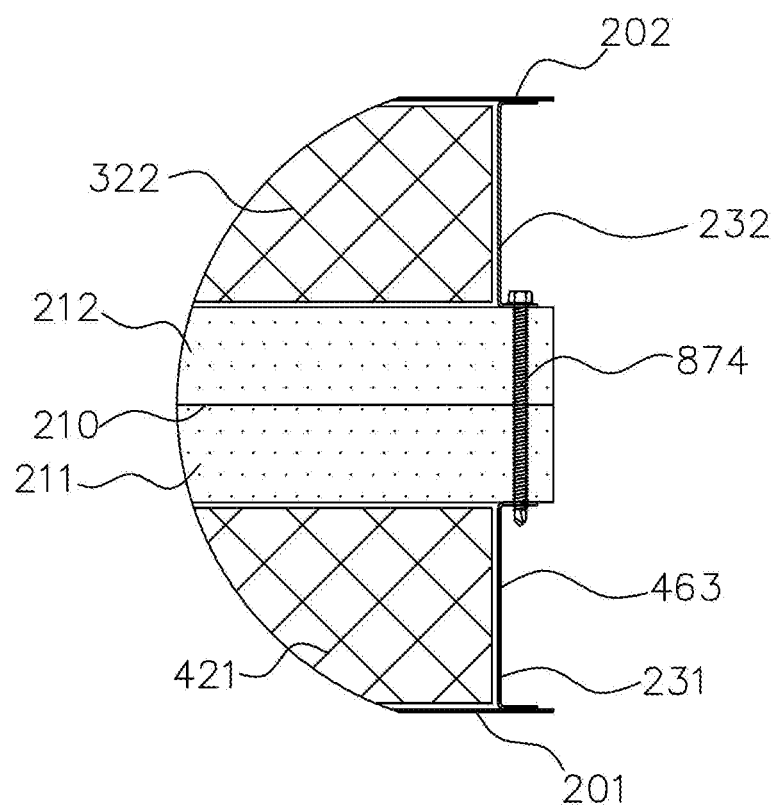
FIG. 8 is a detail cross-sectional view taken along the section line shown in FIG. 3, that shows, among other things, at least part of: the first skin, the second skin, the first layer of insulation, the second layer of insulation, the first portion of the frame, the second portion of the frame, the layer of fire-resistant material (e.g., two contiguous layers of gypsum board), cross sections of two elongated members or channels that are part of the frame, and a screw that connects the two portions of the frame to each other through the layer of fire-resistant material.

Even further, various embodiments include multiple holes (e.g., 340 shown in FIGS. 3-4). In some such embodiments, for example, (e.g., as shown) the frame (e.g., 230) includes the multiple holes (e.g., 340). Further, in many embodiments that include the multiple holes (e.g., 340), the multiple holes are in at least one row, or in many embodiments, are in at least two rows. In particular embodiments, for example, the frame (e.g., 230) includes multiple holes (e.g., 340) in at least two rows, for example, in three rows. In FIGS. 3, and 4, for example, each portion 231 and 232 (e.g., shown in FIGS. 3-8) of frame 230 has three rows of holes 340. In the embodiment illustrated, for example, first portion 231 of frame 230 has rows 341, 342, and 343 (e.g., shown in FIG. 3) of holes 340 and second portion 232 of frame 230 has rows 344, 345, and 346 of holes 340. Further still, in a number of embodiments, (e.g., slotted) internal support (e.g., channels, for instance, frame 230) provides structural strength while adding only limited thermal conductivity to the panel (e.g., 10). Various embodiments described herein can be significantly stronger than prior art panels with a similar fire rating.

Various embodiments (e.g., including but not limited to embodiments described in the previous paragraph) are or include a fire-retardant panel (e.g., 10) that includes a frame (e.g., 230) that includes multiple holes (e.g., 340) in at least two rows (e.g., of rows 341-346 shown in FIG. 3). In many such embodiments, the fire-retardant panel (e.g., 10) further includes a first skin (e.g., that includes a first layer of sheet metal, for instance, 201), a layer of fire-resistant material (e.g., gypsum, for instance, layer 210), a first layer of insulation (e.g., 421 shown in FIGS. 4-8), or a combination thereof, as examples. Further, in various such embodiments, that include the first skin (e.g., 201) and the layer of fire-resistant material (e.g., 210), the first layer of insulation (e.g., 421) is between the first skin (e.g., 201) and the layer of fire-resistant material (e.g., 210). Still further, in many embodiments that include the multiple holes (e.g., 340), the multiple holes reduce heat conduction (e.g., from a fire) through the fire-retardant panel (e.g., 10), for example through the frame (e.g., 230). Further still. In some embodiments, that include the first skin (e.g., 201), the panel (e.g., 210) further that includes a second skin (e.g., 202, for example, that includes a second layer of sheet metal). Even further, in some such embodiments that include the layer of fire-resistant material (e.g., 210), the layer of fire-resistant material is between the first skin (e.g., 201) and the second skin (e.g., 202), between the first layer of insulation (e.g., 421) and the second skin (e.g., 202), or both. Even further still, in various such embodiments, the fire-retardant panel (e.g., 10) further includes a second layer of insulation (e.g., 322), the layer of fire-resistant material (e.g., 210) is between the first skin (e.g., 201) and the second layer of insulation (e.g., 322), the layer of fire-resistant material (e.g., 210) is between the first layer of insulation (e.g., 421) and the second layer of insulation (e.g., 322), or a combination thereof, as examples. Moreover, in various embodiments that include the layer of fire-resistant material (e.g., 210), the layer of fire-resistant material is located in the middle of the fire-retardant panel (e.g., 10), for example, occupying a central location between the first skin (e.g., 201) and the second skin (e.g., 202), between the first layer of insulation (e.g., 421) and the second layer of insulation (e.g., 322), or both. Furthermore, in various embodiments that include the layer of fire-resistant material (e.g., 210), the layer of fire-resistant material is located (e.g., in a central location) between the first portion of the frame (e.g., 231) and the second portion of the frame (e.g., 232).

As mentioned, in various embodiments that include the layer of fire-resistant material (e.g., 210), the layer of fire-resistant material includes gypsum or calcium silicate, as examples. Certain embodiments include calcium silicate, certain embodiments include (e.g., within the layer of fire-resistant material, for instance, 210) gypsum, and particular embodiments include both. Further, in many embodiments, the fire-retardant panel (e.g., 10) or the layer of fire-resistant material (e.g., 210) includes gypsum board (e.g., prefabricated, for instance, with two paper layers, for example, one on each side of the gypsum). Calcium Silicate is a potential replacement material for gypsum board in some embodiments. Still further, in some embodiments of the fire-retardant panel (e.g., 10) that include the layer of fire-resistant material (e.g., 210), the layer of fire-resistant material (e.g., 210) includes two layers (e.g., 211 and 212 shown in FIGS. 3-8), for example, two layers of gypsum board. In some such embodiments, the two layers (e.g., 211 and 212) are contiguous (e.g., touching, for instance, as shown). In other embodiments, however, the two layers (e.g., 211 and 212) are separated by a distance. Even further, although not shown, in some such embodiments, the distance contains a third layer of insulation, a (e.g., third) layer of sheet metal, or both. Even further still, in some embodiments, the fire-retardant panel (e.g., 10) or the layer of fire-resistant material (e.g., 210) includes two or more layers (e.g., 211 and 212), two or more layers of gypsum board (e.g., 211 and 212), more than two layers (not shown), or more than two layers of gypsum board, as examples. Different embodiments include 1, 2, 3, 4, 5, 6, 7, 8, 9, or 10 layers (e.g., each containing gypsum, calcium silicate, or both) or layers of gypsum board, as examples.

Further, in various embodiments, the fire-retardant panel (e.g., 10) or the layer of fire-resistant material (e.g., 210, for instance, layer 211, 212, or both) includes ⅝-inch thick gypsum board, mold or moisture resistant gypsum board, fire-resistant gypsum board, or type X drywall or gypsum board (e.g., at least one, at least two, or two layers), for example, 10 ft×4 ft×⅝ in gypsum panels. In various embodiments, the layer of fire-resistant material (e.g., 210) has a higher specific heat than alternative materials, for example, than the insulation (e.g., of layer 421, 322, or both). As a result, in many embodiments, the layer of fire-resistant material (e.g., 210) takes longer to heat up in a fire. Further, in various embodiments, the layer of fire-resistant material (e.g., 210) contains fibers, for example, glass fibers, for instance, in a random orientation, for example, intermixed within gypsum. In various embodiments, such fibers make the layer of fire-resistant material (e.g., 210) stronger, maintain its integrity when hot better (e.g., in a fire), or both, as examples. In a number of embodiments, for example, glass fibers intermixed with the gypsum increase the fire resistant and structural integrity of the panel (e.g., 10) and extend the length of time the gypsum panel resists fire without failure. In many embodiments, fire-resistant gypsum board (e.g., of 210) offers better fire-retardant ability than fire-retardant mineral wool (e.g., of layer 421, 322, or both). Further, in various embodiments, fire-resistant material, (e.g., 210, for instance, gypsum board) has a significant larger specific heat than the insulation (e.g., of layer 421, 322, or both) or than fire-resistant mineral wool. In a number of embodiments, however, the fire-resistant material (e.g., 210, for instance, fire-resistant gypsum board) has similar thermal conductivity to the insulation (e.g., of layer 421, 322, or both, for instance, fire resistant mineral wool). Further still, some embodiments combine fire-resistant gypsum board (e.g., 210) and fire-retardant mineral wool (e.g., 421, 322, or both), for example, for even better performance. Even further, certain embodiments combine a (e.g., slotted) channel design (e.g., frame 230) for structural strength with (e.g., dense) mineral wool and gypsum board to form a unique design with improved fireproofing capability (e.g., in comparison with certain alternatives).

In a number of embodiments, (e.g., of a fire-retardant panel, for instance, 10) that include insulation (e.g., layer 421, 322, or both), the insulation includes a fibrous or stranded material, for example, mineral wool. An example is Roxul Model: CONROCK, Dimension: 8 ft×4 ft×4 in, Website: roxul-conrock. Moreover, in a number of embodiments, the insulation includes a binder (e.g., in addition to the fibrous material). In various embodiments, for example, the insulation includes at least 5, 10, 25, 50, 75, 90, or 95 percent mineral wool, as examples (e.g., by mass). In particular embodiments, for example, the insulation consists essentially of mineral wool. In particular embodiments, the insulation includes fiberglass (e.g., in addition to or as an alternative to mineral wool) as other examples. Mineral wool, however, may be denser than fiberglass. Moreover, in a number of embodiments, mineral wool remains dimensionally stable. Further, in certain embodiments, the insulation is or includes foam, for example, that is capable of withstanding high temperatures, for instance, ceramic foam.

Further, in many embodiments where the fire-retardant panel (e.g., 10) includes the first layer of sheet metal (e.g., 201), the sheet metal includes steel, for example, galvanized steel or stainless steel, for instance, 18 or 20 gauge. In various embodiments, the second skin (e.g., 202) may be the same or similar. Other embodiments may use other thicknesses of sheet metal or plate. Still further, some embodiments include aluminum, copper, or both. Still further, in some embodiments that include the first skin (e.g., 201) and the second skin (e.g., 202), the first skin is parallel to the second skin. As used herein, unless stated otherwise, "parallel" means to within 10 degrees. In various embodiments, however, where "parallel" is stated herein, the components (e.g., layer, skin, etc.) are parallel to within 0.5, 1, 2, 3, 4, 5, 6, 8, 12, 15, 20, 25, or 30 degrees, as other examples. Further still, in particular embodiments of a fire-retardant panel (e.g., 10) that includes the first skin (e.g., 201) and the layer of fire-resistant material (e.g., 210), the first skin (e.g., 201) is parallel to the layer of fire-resistant material (e.g., 210). Even further, in many embodiments that include the first layer of insulation (e.g., 421) and the layer of fire-resistant material (e.g., 210), the first layer of insulation (e.g., 421) is parallel to the layer of fire-resistant material (e.g., 210). Similarly, in a number of embodiments of a fire-retardant panel (e.g., 10) that includes the first skin (e.g., 201) and the first layer of insulation (e.g., 421), the first skin (e.g., 201) is parallel to the first layer of insulation (e.g., 421). In a number of embodiments, the same may be true for other layers described herein. Moreover, in many embodiments of a fire-retardant panel (e.g., 10) that includes the first skin (e.g., 201) and the first layer of insulation (e.g., 421), the first skin (e.g., 201) is contiguous with the first layer of insulation (e.g., 421). Even further still, in many embodiments, that include the first layer of insulation (e.g., 421) and the layer of fire-resistant material (e.g., 210), the first layer of insulation (e.g., 421) is contiguous with the layer of fire-resistant material (e.g., 210).

Figure 2:
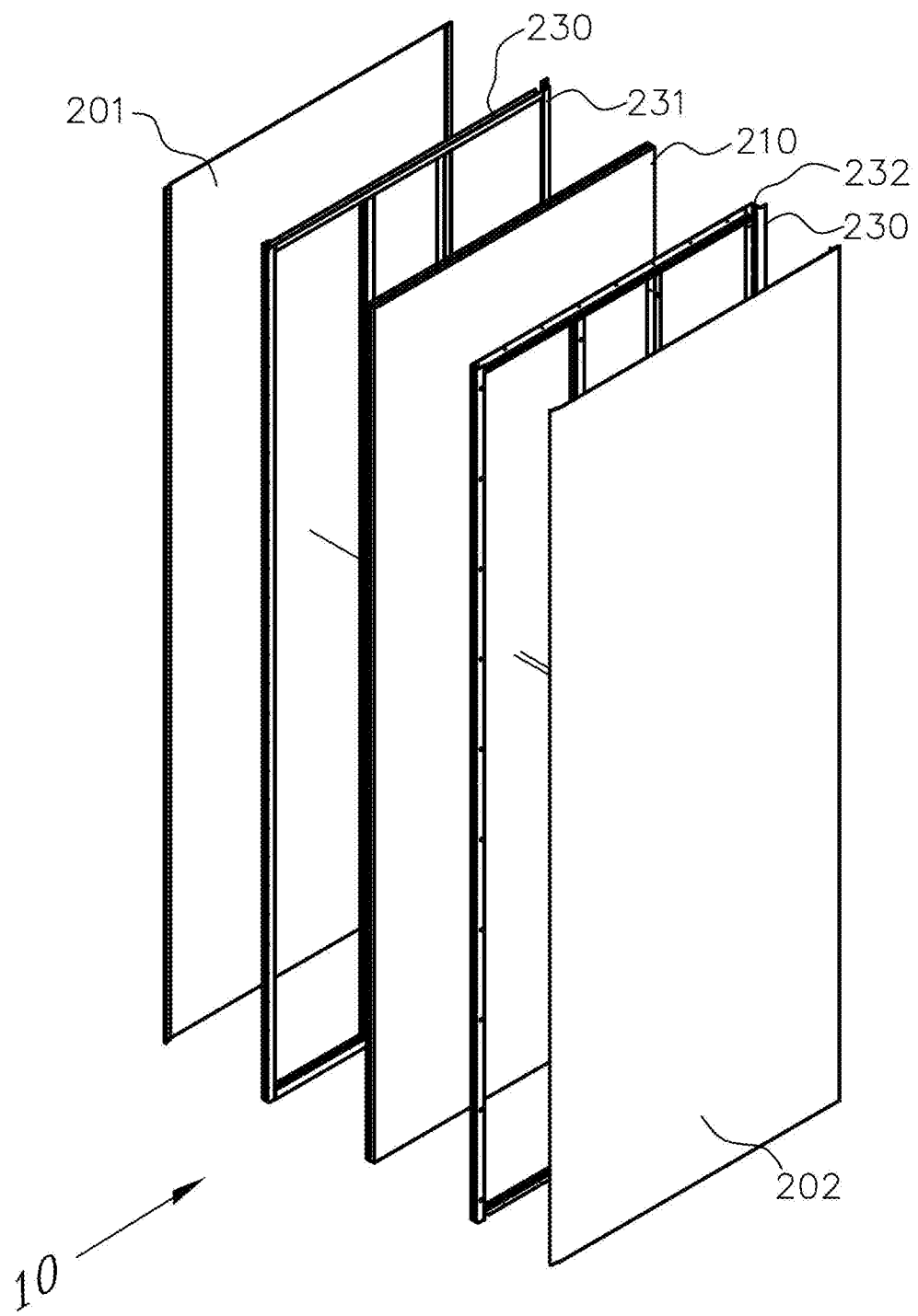
FIG. 2 is an exploded isometric view of the panel of FIG. 1 showing a first skin, a second skin, a frame that has two portions, and a layer of fire-resistant material (e.g., two contiguous layers of gypsum board), but with insulation not shown to better illustrate these other components.

In various embodiments, the panel (e.g., 10) has a perimeter (e.g., 150 shown in FIG. 1). Further, in some embodiments of the fire-retardant panel (e.g., 10) that include the frame (e.g., 230), the frame extends around the perimeter (e.g., 150) of the panel. As used herein, unless stated otherwise, a frame "extends around the perimeter" of a panel when the frame is within ten percent of the greatest overall dimension (e.g., diagonal) of the panel from the perimeter at every point around the perimeter (e.g., 150) of the panel. In some embodiments, however, the frame (e.g., 230) is within 1, 2, 3, 4, 5, 6, 8, 12, 15, 20, or 25 percent of the greatest overall dimension of the panel (e.g., 10) from the perimeter (e.g., 150) at every point around the perimeter of the panel, as other examples. Still further, in various embodiments of a fire-retardant panel (e.g., 10) that include the frame (e.g., 230), the frame includes metal (e.g., steel, stainless steel, aluminum, etc.). In a number of embodiments, for example, the frame (e.g., 230) specifically includes steel. Even further, in some embodiments, the frame (e.g., 230) includes sheet metal (e.g., galvanized steel, for instance, 16 gauge, for example, cut with a plasma cutter). Moreover, in some embodiments, the frame is coated, for example, with zinc or paint. Further still, in many such embodiments, the sheet metal includes a least one bend or multiple bends, for example, two or at least two (e.g., parallel) bends, for instance, (e.g., two) right-angle bends. As used herein, unless stated otherwise, a "right-angle" (or "right angle", e.g., bend, connection, etc.) is between 80 and 100 degrees. In other embodiments, however, where a "right-angle" (or "right angle", e.g., bend, connection, etc.) is identified herein, the angle is between 88 and 92 degrees, between 85 and 95 degrees, between 82.5 and 97.5 degrees, between 75 and 105 degrees, between 70 and 110 degrees, between 75 and 90 degrees, or between 90 and 105 degrees, as examples. Parallel right-angle bends 433 and 434 are identified in FIGS. 4 and 6, as an example, in first portion 231 of frame 230, in elongated member 465, which is a (e.g., structural) channel.

In many fire-retardant panels (e.g., 10) that include a frame (e.g., 230), the frame includes at least one structural channel (e.g., 461, 462, 463, 465, or 466, as shown in FIG. 4, or a combination thereof). As used herein, a "structural channel" or C-beam has a cross section that includes a web and two flanges at the edges of the web that stick out on one side of the web. In the embodiment shown, elongated member 464 also has two parallel bends, but is not a channel, and has a cross section that includes a web and two flanges at the edges of the web that stick out on opposite sides of the web. Second portion 232 of frame 230 has a similarly-shaped but opposite hand elongated member 494 that is parallel to and opposite elongated member 464. See FIGS. 3, 4, and 7. Elongated members 464 and 494 form groove 392, in the embodiment illustrated, which is described in more detail below. In some (e.g., sheet metal) embodiments, the flanges are the same piece of material (e.g., sheet metal) as the web and there is a bend (e.g., right-angle, for example, bends 433 and 434 for channel or elongated member 465 in FIGS. 4 and 6) between each flange and the web. Further, in some embodiments, the frame (e.g., 230) includes multiple structural channels (e.g., 461-466 for portion 232 of frame 230 shown in FIG. 4). In the embodiment shown, portion 231 of frame 230 has similar channels or elongated members. In some such embodiments, for example, the multiple structural channels are adjacent to or connected to each other. In this context, as used herein, "connected to" includes being the same piece of material, separated by one or more bends, for instance, a right-angle bend). In other embodiments, different channels (e.g., some or all of 461-466) are connected, as examples, with one or more welds (e.g., MIG welding, tack welds, or spot welds), fasteners (e.g., screws, bolts, or rivets), connectors, fittings, or the like. Still further, as used herein, unless stated otherwise, "adjacent" includes embodiments that are connected, contiguous, or within ten percent of an overall length of the member (e.g., channel). Even further, where "adjacent" is used herein, in particular embodiments, the two members that are adjacent are connected, contiguous, or within ten percent of an overall length of the (e.g., shorter) member (e.g., channel). Even further still, where "adjacent" is used herein, in certain embodiments, the two members that are adjacent are within 1, 2, 3, 4, 5, 6, 8, 12, 15, 20, or 25 percent of an overall length of the (e.g., shorter) member (e.g., channel). In certain embodiments, however, some or all channels or elongated members of the frame are not (e.g., directly) connected to each other, for instance, even where such channels or elongated members of the frame are adjacent to each other.

In certain embodiments, for example, the frame (e.g., 230 or portion 231 thereof) includes a first elongated member (e.g., 461 shown in FIG. 4), a second elongated member (e.g., 462, for instance, adjacent to the first elongated member, for example, 461), a third elongated member (e.g., 463, for instance, adjacent to the second elongated member, for example, 462, opposite the first elongated member, for example, 461, or both), a fourth elongated member (e.g., 464, for instance, adjacent to the third elongated member, for example, 463, adjacent to the first elongated member, for example, 461, opposite the second elongated member, for example, 462, or a combination thereof), or a combination (e.g., all) of such members (e.g., 461-464). Further, as used herein, unless stated otherwise, "elongated" means having a longest overall dimension that is at least three (3) times any overall dimension that is perpendicular to the longest overall dimension. In particular embodiments, however, where "elongated" is stated herein, the elongated member or feature (e.g., channel, hole, etc.) has a longest overall dimension that is at least 1.5, 2, 4, 5, 6, 7, 8, 9, 10, 12, 15, 20, or 25 times any overall dimension that is perpendicular to the longest overall dimension, as other examples. Further still, in some embodiments of a fire-retardant panel (e.g., 10, for instance, that includes the first elongated member, for example, 461, the second elongated member, for example, 462, the third elongated member, for example, 463, the fourth elongated member, for example, 464, or a combination thereof) the panel (e.g., 10, for instance, further) includes a fifth elongated member (e.g., 465, 466, or both), for example, extending from the first elongated member (e.g., 461) to the third elongated member, (e.g., 463, for example, midway or evenly spaced) between the second elongated member (e.g., 462) and the fourth elongated member (e.g., 464), or both. In certain embodiments, for example, the fifth elongated member (e.g., 465, 466, or both) is parallel to the second elongated member (e.g., 462), the fourth elongated member (e.g., 464), or both. Still further, in some embodiments that include the first elongated member (e.g., 461) and the third elongated member (e.g., 463), the first elongated member is parallel to the third elongated member. Even further, some embodiments include one or other (e.g., internal, elongated, or both) frame members, for example, parallel (e.g., evenly spaced with other parallel members) or perpendicular to the fifth elongate member (e.g., 465, 466, or both).

In various embodiments of a fire-retardant panel (e.g., 10, for instance, that include the first elongated member, the second elongated member, the third elongated member, and the fourth elongated member, for example, 461-464), the first elongated member (e.g., 461) is connected to the second elongated member (e.g., 462), the fourth elongated member (e.g., 464), or both. Further, in a number of embodiments, the third elongated member (e.g., 463) is connected to the second elongated member (e.g., 462), the fourth elongated member (e.g., 464), or both. Still further, in different embodiments, at least one, at least two, at least three, or all of the first elongated member (e.g., 461), the second elongated member (e.g., 462), the third elongated member (e.g., 463), and the fourth elongated member (e.g., 464) is a structural channel. Further still, in a number of embodiments, the first elongated member (e.g., 461) and the second elongated member (e.g., 462) are at a right angle, the first elongated member (e.g., 461) and the fourth elongated member (e.g., 464) are at a right angle, the second elongated member (e.g., 462) and the third elongated member (e.g., 463) are at a right angle, or a combination thereof.

Even further, in various embodiments of a fire-retardant panel (e.g., 10) that includes the frame (e.g., 230) and the first skin (e.g., 201), the first skin is attached to the frame (e.g., 230, for instance, first portion 231), for example, with one or more welds (e.g., spot welds). Further still, in various embodiments that include the frame (e.g., 230) and the second skin (e.g., 202), the second skin is attached to the frame (e.g., second portion 232, for example, with screws, for instance, 680 shown in FIG. 6). In some embodiments, for example, welds are used to attach the skin (e.g., 201) that is on the side of the panel (e.g., 10) that faces a fire risk (e.g., flammable materials, risk of ignition, or both), and fasteners, such as screws (e.g., 680), are used to attach the skin (e.g., 202) on the side of the panel that faces away from the fire risk. In many embodiments, the first skin (e.g., 201) or weld surface is the hot side (e.g., the side designed to be exposed to a flame) and the second skin (e.g., 202) or screw surface is the cold side (e.g., the side that is designed to be unexposed to flame). Other embodiments, however, use welds on both sides or fasteners (e.g., screws) on both sides to attach the skins (e.g., to the frame). Some embodiments use an adhesive (e.g., in addition to or instead of the welds, fasteners, or both), for example, between the skin and insulation or layer of fire-resistant material.

In some embodiments, the frame (e.g., 230) includes a first portion (e.g., 231, for instance, adjacent to or attached to the first skin, for example, 201) and a second portion (e.g., 232, for instance, adjacent to attached to the second skin, for example, 202). In some such embodiments, for example, the first portion (e.g., 231) and the second portion (e.g., 232) are separated by the layer or layers (e.g., 2 layers 211 and 212 shown) of fire-resistant material (e.g., 210). The FIGS. illustrate an example. In particular embodiments, the first portion (e.g., 231), the second portion (e.g., 232), or both, of the frame (e.g., 230), each include some or all of the features or components described herein for the frame, for example, holes or slots (e.g., 340, for example, one or more rows 341-346 thereof, for instance, staggered), structural channel, sheet metal, one or more bends (e.g., 433, 434, or both), elongated members (e.g., 461, 462, 463, 464, 465, 466, or a combination thereof), etc. In some embodiments, for example, the first portion (e.g., 231) and the second portion (e.g., 232) are attached (i.e., to each other), for instance, with fasteners, such as screws, that extend into or through the layer of fire-resistant material (e.g., 210). FIGS. 5-8 illustrate screws 571, 672, 773, and 874, as examples. In some embodiments, the first portion (e.g., 231) of the frame (e.g., 230) is attached to the second portion (e.g., 232) of the frame, for example, with screws (e.g., 571, 672, 773, and 874) that are under the skin (e.g., 201, 202, or both) and do not penetrate the skin.

Certain embodiments include a first skin (e.g., 201) that is contiguous with and attached (e.g., welded) to a first portion (e.g., 231) of a frame (e.g., 230). In many embodiments, within the first portion (e.g., 231) of the frame (e.g., 230), contiguous with the first skin (e.g., 201), or both, is a first layer of insulation (e.g., 421). See, for example, FIGS. 3 to 8. In various embodiments, the first portion (e.g., 231) of the frame (e.g., 230), the first layer of insulation (e.g., 421), or both, are contiguous with the layer of fire-resistant material (e.g., 210, for example, gypsum board, for instance, made up of two layers, for example, 211 and 212). On the opposite side of the layer of fire-resistant material (e.g., 210), in many embodiments, is a second skin (e.g., 202), for example, that is contiguous with, attached (e.g., screwed, for instance, with screws 680) to, or both, to a second portion (e.g., 232) of the frame (e.g., 230). Within the second portion (e.g., 232) of the frame (e.g., 230), in various embodiments, contiguous with the second skin (e.g., 202), or both, is a second layer of insulation (e.g., 322), in many embodiments. The second portion (e.g., 232) of the frame (e.g., 230), the second layer of insulation (e.g., 322), or both, are contiguous with the layer of fire-resistant material (e.g., 210) in some embodiments. Further, in some embodiments, the panel (e.g., 10) is constructed starting with the first skin (e.g., 201) and first portion (e.g., 231) of the frame (e.g., 230), and the second portion (e.g., 232) of the frame (e.g., 230) is screwed (e.g., with screws 571, 672, 773, 874, and other similar screws) to the first portion (e.g., 231) of the frame (e.g., 230) through the layer of fire-resistant material (e.g., 210, for example, at or near the center of each flange of the frame, for instance, 230) before the second skin (e.g., 202) is screwed (e.g., with screw 680 shown in FIG. 6 and other similar screws) to the second portion (e.g., 232) of the frame (e.g., 230). In various embodiments, the insulation (e.g., of layer 421, 322, or both) is cut to fit within (e.g., each portion of) the frame (e.g., 230). In some embodiments, the insulation is (e.g., at least partially) compressed within the frame or portion thereof. Further, in many embodiments, the insulation (e.g., each of two layers, for instance, 421 and 322) is compressed between the skin (e.g., 201 or 202) and the layer of fire-resistant material (e.g., 210).

In many embodiments, the fire-retardant panel (e.g., 10) includes a tongue (e.g., 391 shown in FIGS. 3-5) at a first edge of the panel and a groove (e.g., 392 shown in FIGS. 3, 4, and 7) at a second edge of the panel, for example, opposite or parallel (or both) to the first edge. In a number of embodiments, for example, the tongue (e.g., 391) and the groove (e.g., 392) are sized so that multiple identical panels of the fire-retardant panel (e.g., 10) join together with the tongue (i.e., of one panel) in the groove (i.e., of an adjacent panel). Further, in various embodiments, clearance between the tongue (e.g., 391) and the groove (e.g., 392), (i.e., of adjacent panels) is minimized (e.g., without overly hampering installation) to limit passage of air, heat, or smoke in the event of a fire, between adjacent or connected panels (e.g., 10). In some embodiments, the tongue and groove connections further include screws, a seal, caulk, paint, or a combination thereof (e.g., that partially or completely fills gaps, either when applied or when heated, for example, in a fire, or both). In particular embodiments, a powder coating is used. Still further, in various embodiments, a non-flammable or non-explosive paint is used. Various embodiments include roll formed tongue-and-groove construction, for example, with a fully enclosed or insulated joint (or both).

In a number of embodiments, this can give panels a better fit, for example, with a closer tolerance. Some embodiments require no screws through the panel joints which can reduce installation cost. Further, in particular embodiments, the possibility of air or noise leaks is reduced in comparison with certain alternatives. In various embodiments, factory cut and framed openings seal exposed insulation, reduce field labor (e.g., at the jobsite), or both. SEMCO document AT-PANL Technical Guide, 2017-06 provides further detail and illustration of an example of a tongue-and-groove connection and is incorporated herein by reference.

As described above, in a number of embodiments, the fire-retardant panel (e.g., 10) includes multiple holes (e.g., 340 shown in FIGS. 3 and 4), for examples, formed in at least one row or in at least two rows (e.g., rows 341-346 shown). In many embodiments, for example, the multiple holes (e.g., 340) are in at least three rows or are in three rows specifically (e.g., as shown for each of portions 231 and 232). In various embodiments, for example, the multiple holes (e.g., 340) in one row (e.g., in a middle row, for instance, 342 or 345) are staggered with the multiple holes (e.g., 340) in at least one or multiple other rows (e.g., the other two rows, for instance, 341 and 343 for middle row 342, for example, adjacent rows), for instance, of the three rows (e.g., 341, 342, and 343 for first portion 231 of frame 230). In this context, as used herein, "staggered" means that the centers of the holes (e.g., 340) do not line up in a direction perpendicular to the rows (e.g., 341-346) in the plane (e.g., of the sheet metal or frame, for instance, the web) through which the holes (e.g., 340) penetrate. In various embodiments of a fire-retardant panel (e.g., 10) that includes multiple holes (e.g., 340) in the at least two rows (e.g., 341-346), the multiple holes (e.g., 340) are staggered in the at least two rows (e.g., 341-346). In many embodiments, for example, holes (e.g., 340) in adjacent rows (e.g., 341 and 342 or 342 and 343) are staggered (e.g., as shown). Further, in many embodiments, the multiple holes (e.g., 340) are evenly staggered in the at least two rows, for example, in adjacent rows (e.g., 341 and 342 or 342 and 343). As used herein, unless stated otherwise, "evenly staggered" means that the centers of the holes (e.g., 340) in one row are evenly spaced, to within ten (10) percent of the distance between adjacent holes in one row, with the holes in the other (e.g., adjacent) row when viewed in the direction that is perpendicular to the rows in the plane (e.g., of the sheet metal or frame) through which the holes penetrate. Further still, in various embodiments, the centers of the holes (e.g., 340) in one row (e.g., 341) are evenly spaced, to within 1, 2, 3, 4, 5, 6, 8, 12, 15, 20, 25, 30, 40, or 50 percent of the distance between adjacent holes in one row, with the holes in the other (e.g., adjacent) row (e.g., 342) when viewed in the direction that is perpendicular to the rows in the plane (e.g., of the sheet metal or frame, for instance, 230) through which the holes penetrate, as other examples.

In some embodiments of a fire-retardant panel that includes multiple holes, the multiple holes are round. In many embodiments of a fire-retardant panel that includes multiple holes, however, the multiple holes (e.g., 340) are elongated. Further, in a number of embodiments, that include the multiple holes, the multiple holes (e.g., 340) are slots. As used herein, unless stated otherwise, "slots" have straight parallel sides that are parallel to the longest dimension of the slot and the longest dimension of the slot is at least twice as long as the perpendicular dimension within the plane of the material (e.g., sheet metal) in which the slot is formed. As used herein, unless stated otherwise, in the context of slots "straight" means to within ten (10) percent of the greatest overall dimension of the slot. Holes 340 shown in FIGS. 3 and 4 are examples of holes that are elongated, that are slots, and that are staggered. Other embodiments, however, may differ or may include holes that are more-specifically or less-specifically shaped. In various examples, slots have straight sides to within 1, 2, 3, 4, 5, 6, 8, 12, 15, 20, 25, 30, 40, or 50 percent of the longest dimension of the slot. Still further, in some embodiments, the longest dimension of the slot is at least 1.5, 3, 4, 5, 6, 7, 8, 9, 10, 12, or 15 times as long as the perpendicular dimension within the plane of the material (e.g., sheet metal) in which the slot is formed. Even further, in some embodiments, the slots have rounded ends, for example, each end being a semi-circle. In one example (e.g., elongated members 462, 464, 465, and 466), slots are 92 mm long and 2 mm wide, there is 11 mm of material (e.g., sheet metal) between slots in each row, and there is 3 mm of material between slots in adjacent rows. In another example (e.g., elongated members 461 and 463), slots are 93 mm long and 3 mm wide, there is 10 mm of material (e.g., sheet metal) between slots in each row, and there is 5 mm of material between slots in adjacent rows. In various embodiments, slots are 50-150 mm long, 60-125 mm long, 70-115 mm long, 75-110 mm long, 80-105 mm long, 85-100 mm long, or 90-95 mm long, as examples. Even further still, in various embodiments, slots are 0.5-10, 1-5, 1-4, 1.5-3.5, or 2-3, mm wide, as examples. Moreover, in various embodiments, there is 5-20, 6-18, 7-17, 8-15, or 9-12 mm of material between ends of slots or holes in each row, as examples. Furthermore, in various embodiments, there is 1-15, 1.5-10, 2-7, 2.5-6, or 3-5 mm of material (e.g., sheet metal) between holes or slots in adjacent rows, as examples. In various embodiments, a slotted frame (e.g., 230) or support channel (e.g., 461-466) decreases the heat transfer rate compared to a solid frame or support channel. In particular embodiments, for example, the slot design suppresses 10 to 15 percent of temperature increase caused by heat transfer. Other embodiments, however, may differ.

Further, in various embodiments that include the slots (e.g., holes 340, which are slots in the embodiment shown), the slots (i.e., the longest axis of the slots or the straight sides of the slots) are parallel (i.e., to each other, for example, in the portion of the frame in which the slot is located). Further still, in some embodiments, the slots (i.e., the longest axis of the slots or the straight sides of the slots) are parallel to the first skin (e.g., 201), the second skin (e.g., 202), the layer of fire-resistant material (e.g., 210), the first layer of insulation (e.g., 421), the second layer of insulation (e.g., 322), the portion of the frame in which the slot is formed (e.g., portion 231 for slots in rows 341-343, or portion 232 for slots in rows 344-346), the row (e.g., 341-346) of holes or slots that the slot is part of, one or more other rows (e.g., of 341-346) of holes or slots, or a combination thereof. Even further, in some embodiments of fire-retardant panels (e.g., 10, for instance, that include the first skin, for example, 201, and the multiple holes, for example, 340), at least one row (e.g., of rows 341-346) of the multiple holes (e.g., 340) is parallel to the first skin (e.g., 201), the second skin (e.g., 202), the layer of fire-resistant material (e.g., 210), the first layer of insulation (e.g., 421), the second layer of insulation (e.g., 322), the portion (e.g., 231 or 232) of the frame (e.g., 230) in which the row (e.g., 341-346) is formed, or a combination thereof, as examples. Further still, in particular embodiments of a fire-retardant panel (e.g., 10) that includes the multiple holes (e.g., 340) in at least two rows (e.g., of rows 341-346), the at least two rows are parallel to the first skin (e.g., 201), the second skin (e.g., 202), the layer of fire-resistant material (e.g., 230), the first layer of insulation (e.g., 421), the second layer of insulation (e.g., 322), the portion (e.g., 232) of the frame (e.g., 230) in which the row (e.g., 341-346) is formed, or a combination thereof, as examples. Still further, in various embodiments of a fire-retardant panel (e.g., 10) that includes multiple holes (e.g., 340), the panel includes a perimeter (e.g., 150 shown in FIG. 1, for example, as described above) and the multiple holes (e.g., 340) extend around the perimeter (e.g., 150).

Further still, in a number of embodiments of a fire-retardant panel (e.g., 10) that includes the multiple holes (e.g., 340), the second elongated member (e.g., 462), and the fourth elongated member (e.g., 464, for instance, described above), the multiple holes (e.g., 340) are located in the second elongated member (e.g., 462), in the fourth elongated member (e.g., 464), or both. Even further, in various embodiments that include the multiple holes (e.g., 340), the first elongated member (e.g., 461), the second elongated member (e.g., 462), the third elongated member (e.g., 463), and the fourth elongated member (e.g., 464), the multiple holes (e.g., 340) are located in the first elongated member (e.g., 461), the second elongated member (e.g., 462), the third elongated member (e.g., 463), the fourth elongated member (e.g., 464), or a combination (e.g., all four) thereof. Even further still, in some embodiments that include the multiple holes (e.g., 340) and the fifth elongated member (e.g., 465, 466, or both, for instance, described above), the multiple holes (e.g., 340) are (e.g., also) located in the fifth elongated member (e.g., 465, 466, or both).

Even further, in many embodiments of a fire-retardant panel (e.g., 10) that includes the multiple holes (e.g., 340), the multiple holes are evenly spaced (e.g., in one or more rows, for instance, one or more of rows 341-346). As used herein, unless stated otherwise, "evenly spaced" means that the distance between the centers of adjacent holes (e.g., 340, for example, within a row) is equal to within ten (10) percent. In some embodiments, however, the distance between the centers of adjacent holes (e.g., within a row) is equal to within 1, 2, 3, 4, 5, 6, 8, 12, 15, 20, or 25 percent, as other examples. Further, as used herein, unless stated otherwise, "evenly spaced" means between adjacent holes (e.g., 340) within each row in a member if the holes are in one or more rows (e.g., one or more of rows 341-346). Further still, as used herein, unless stated otherwise, holes (e.g., 340) are in a "row" if the centers of the holes (i.e., in the row in the same member, for example, one of rows 341-346) are in a straight line to within the greatest overall dimension of the holes (e.g., 340, for instance, as shown in FIGS. 3 and 4). In some embodiments, however, the centers of the holes (i.e., in the row in the same member) are in a straight line to within 2, 5, 10, 25, 50, 75, 125, 150, or 200 percent of the greatest overall dimension of the holes, as examples. In different embodiments of fire-retardant panels (e.g., 10) that include the multiple holes (e.g., 340), at least a plurality of the multiple holes (e.g., 340) are evenly spaced or at least a majority of the multiple holes (e.g., 340) are evenly spaced, for example, in at least one row, in at least two rows, in at least three rows, or specifically in three rows (e.g., 341, 342, and 343 for portion 231 of frame 230), as examples. In other embodiments, the multiple holes are arranged in a different pattern, for example, a honeycomb pattern.

In many embodiments, the fire-retardant panel (e.g., 10) is fabricated in a factory before being shipped to a jobsite and installed at the jobsite. Further, in various embodiments, the fire-retardant panel (e.g., 10) is attached (e.g., with tongue and groove connections, for instance, tongue 391 and groove 392) to other identical fire-retardant panels at the jobsite to form a fire-retardant wall, a fire-retardant enclosure, or both. In some embodiments, the fire-retardant panel (e.g., 10) is fabricated to a particular size, for example, 144 inches long, 45.5 inches wide, and 4 inches thick. Still further, in different embodiments, panels (e.g., 10) are made in the factory or cut (e.g., at the jobsite) to shorter dimensions as needed, for example.

Other embodiments include various methods, for example, of reducing fire danger (e.g., in a building). In different embodiments, various methods include at least certain acts. Such acts can include, for example, fabricating fire-retardant panels (e.g., 10) in a factory. In various embodiments, the fire-retardant panels (e.g., 10) are fabricated, for example, in accordance with at least one of the embodiments described herein. In a number of embodiments, such acts can also include, for instance, shipping the fire-retardant panels (e.g., 10) to the jobsite (e.g., the building), installing the fire-retardant panels (e.g., 10, for instance, in the building), or both. Various other acts are described herein or would be apparent to a person of ordinary skill in the art who studied this disclosure.

In many embodiments, fire-retardant panels (e.g., 10) are tested for fire resistance, for example, following a test procedure, for example, according to ASTM E119. In some embodiments, for example, the fire panel (e.g., 10) can pass a two-hour fire resistance certification test. Other embodiments may have a different fire rating. Various embodiments are used in buildings that are at-risk of fire. In many applications, the panels (e.g., 10) can be used to construct, or to add protection to, an (e.g., interior), non-load bearing, (e.g., vertical) wall. In other embodiments, however, fire-retardant panels (e.g., 10) can be used for exterior, structural, or load bearing applications, as other examples, or horizontal installations (e.g., above, below, or forming a ceiling or floor, or to form an enclosure, for example, around a fire hazard or space that requires additional fire protection). In many cases, the performance of building members under fire-exposure conditions is an item of major importance in securing constructions that are safe and that are not a menace to neighboring structures or to the public, as examples. Various fire-retardant panels (e.g., 10) can be used in new or existing buildings, for example, where fire protection is required. Examples include walls and enclosures that isolate boiler rooms, mechanical rooms, flammable materials, or engine-generator sets, for instance. Some embodiments can be used for an HVAC plenum, as another example. Various embodiments can be used for other purposes as well, either structural or non-structural.

What is claimed is:

1. A fire-retardant panel comprising a frame comprising multiple holes wherein the multiple holes reduce heat conduction through the fire-retardant panel.

2. The fire-retardant panel of claim 1 wherein the multiple holes are in at least one row.

3. The fire-retardant panel of claim 1 further comprising a layer of fire-resistant material comprising gypsum or calcium silicate.

4. The fire-retardant panel of claim 1 further comprising: a layer of fire-resistant material; a first skin; and a first layer of insulation; wherein the first layer of insulation is between the first skin and the layer of fire-resistant material.

5. The fire-retardant panel of claim 1 further comprising: a layer of fire-resistant material; a first skin; and a second skin; wherein: the first skin comprises a first layer of sheet metal; the second skin comprises a second layer of sheet metal; and the layer of fire-resistant material is midway between the first skin and the second skin.

6. The fire-retardant panel of claim 1 further comprising a layer of fire-resistant material wherein: the frame includes a first portion and a second portion; and the first portion is separated from the second portion by the layer of fire-resistant material.

7. The fire-retardant panel of claim 1 further comprising a first skin and a second skin wherein: the frame includes a first portion and a second portion; the first portion is attached to the first skin; and the second portion is attached to the second skin.

8. The fire-retardant panel of claim 1 wherein the panel comprises a perimeter and the frame extends around the perimeter.

9. The fire-retardant panel of claim 1 wherein the frame comprises sheet metal comprising two parallel bends.

10. The fire-retardant panel of claim 1 wherein the frame comprises: a first elongated member; a second elongated member adjacent to the first elongated member; a third elongated member adjacent to the second elongated member and opposite the first elongated member; and a fourth elongated member adjacent to the third elongated member, adjacent to the first elongated member, and opposite the second elongated member.

11. The fire-retardant panel of claim 10 wherein the frame further comprises a fifth elongated member extending from the first elongated member to the third elongated member between the second elongated member and the fourth elongated member.

12. The fire-retardant panel of claim 1 further comprising: a first skin that is attached to the frame; and a second skin that is attached to the frame with screws.

13. The fire-retardant panel of claim 1 wherein the multiple holes are elongated.

14. The fire-retardant panel of claim 1 wherein the multiple holes are slots that are parallel to each other.

15. The fire-retardant panel of claim 1 further comprising a first skin wherein: the multiple holes are in at least one row; and the at least one row is parallel to the first skin.

16. A fire-retardant panel comprising: a first skin; a second skin; two layers of fire-resistant material between the first skin and the second skin; and a frame that includes a first portion and a second portion; wherein the first portion and the second portion are separated by the two layers of fire-resistant material.

17. The fire-retardant panel of claim 16 further comprising: a first layer of insulation between the first skin and the two layers of fire-resistant material; and a second layer of insulation between the second skin and the two layers of fire-resistant material.

18. The fire-retardant panel of claim 17 wherein: the panel comprises a perimeter and the frame extends around the perimeter; the first portion of the frame extends from the first skin to the two layers of fire-resistant material; the second portion of the frame extends from the second skin to the two layers of fire-resistant material; the first layer of insulation is located within the first portion of the frame; and the second layer of insulation is located within the second portion of the frame.

19. The fire-retardant panel of claim 16 wherein the first portion of the frame is attached to the second portion of the frame with screws that extend though the two layers of fire-resistant material.

20. The fire-retardant panel of claim 16 wherein: the two layers of fire-resistant material comprise gypsum or calcium silicate; the first skin comprises sheet metal; and the second skin comprises sheet metal.

21. A fire-retardant panel comprising: two layers of fire-resistant material and a frame that includes a first portion and a second portion; wherein the first portion and the second portion are separated by the two layers of fire-resistant material.

22. The fire-retardant panel of claim 21 wherein: the two layers of fire-resistant material comprise two layers of gypsum board.

23. The fire-retardant panel of claim 21 wherein: the two layers of fire-resistant material are contiguous.

24. The fire-retardant panel of claim 21 wherein: the first portion of the frame is attached to the second portion of the frame with screws that extend though the two layers of fire-resistant material.

25. The fire-retardant panel of claim 21 wherein: the two layers of fire-resistant material are two contiguous layers of gypsum board; and the first portion of the frame is attached to the second portion of the frame with screws that extend though the two contiguous layers of gypsum board.

* * * * *